United States Patent Office 3,495,935
Patented Feb. 17, 1970

---

3,495,935
PROCESS FOR PRODUCING CHLORITES
Joseph F. Callerame, Rochester, N.Y., assignor to Chemical Generators Inc., Rochester, N.Y., a corporation of New York
No Drawing. Filed Apr. 12, 1968, Ser. No. 721,053
Int. Cl. C01b *11/10;* C01d *11/00;* C01f *11/00*
U.S. Cl. 23—85                    10 Claims

ABSTRACT OF THE DISCLOSURE

Process for producing alkali metal chlorites and alkaline earth metal chlorites. Alkali metal chlorate or alkaline earth metal chlorate is reacted with perchloric acid in the presence of alkali metal chloride or alkaline earth metal chloride at elevated temperature.

SUMMARY OF THE INVENTION

This invention relates to a process for producing alkali metal chlorite or alkaline earth metal chlorite.

Chlorites of the indicated nature are of considerable industrial importance and have found use, for example, as oxidizing agents and bleaching agents. They are widely employed in the production of varnishes, waxes and the like products. Sodium chlorite is also added to potable water for improving its taste and odor.

Prior art processes for the production of the indicated chlorites are cumbersome, difficult to control and oftentimes dangerous to carry out. In addition, the prior art processes involve initial formation of $ClO_2$ gas which has to be recombined with an alkali metal or alkaline earth metal.

It is the principal object of the present invention to improve on the prior art processes by providing a one-step process in which the respective chlorite is formed in situ and at high yield.

Briefly, and in accordance with the invention, an alkali metal chlorate or an alkaline earth metal chlorate is reacted with perchloric acid in the presence of an alkali metal chloride or alkaline earth metal chloride. The reaction is advantageously conducted in an aqueous system and at elevated temperature in the range of between about 70–200° C. No appreciable reaction takes place at temperatures below 70° C., while temperatures in excess of 200° C. should be avoided in order to eliminate explosion danger. The reaction is advantageously performed at ordinary pressure as tests have indicated that vacuum or excess pressure conditions, unless extreme, do not significantly affect the course of the reaction.

Although applicant does not want to be limited by any theories advanced by him, it is believed that the inventive reaction proceeds according to the following equation:

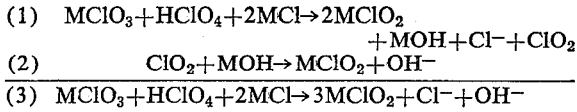

In this equation, M stands for an alkali metal. The reaction, however, proceeds in equivalent manner if M is an alkaline earth metal.

Generally, any alkali metal chlorite or alkaline earth metal chlorite can be produced by the inventive process. The particular metal chlorite formed, as appears from the above equation, is dependent on the metal ion of the metal chloride used in the reaction. If the chloride is sodium chloride, sodium chlorite is thus formed. The particular choice of the metal moiety in the salts to be reacted is not critical. Generally speaking, any alkaline earth metal chlorate may be reacted with, for example, sodium chloride for reasons of economy, while sodium chlorate may be reacted with any alkaline earth metal chloride.

As stated, the reaction preferably should be conducted in an aqueous medium, although other media, such as alcoholic media, are feasible, although not economically sound.

As appears from the above equation, the reactants chlorate, perchloric acid and chloride are preferably used in a mole ratio of 1:1:2, to wit, stoichiometric amounts. Adherence to this mole ratio results in the best yields and is most economical. However, variation of the ratio within reasonable limits does not affect the basic results. The metal chlorite formed in the process may be easily recovered from the reaction mixture, dehydrated or drum dried. If desired, no separation is necessary. If an excess of metal chloride, e.g. sodium chloride, is used in the reaction, the free chlorine formed in the process will combine with the sodium to form sodium chloride which may be crystallized from the reaction product so that essentially pure metal chlorite remains. This metal chlorite may then be dehydrated or drum dried. However, if the molar ratios referred to are being adhered to, free chlorine is formed as a byproduct which may be absorbed in conventional manner or the temperature of the reaction mixture may be raised to expel the free chlorine so that again pure chlorite is left.

In the prior art methods for the production of the indicated metal chlorites, $ClO_2$ gas is always initially formed and this gas has then to be absorbed by an alkali or the like. This step is thus avoided in the present one-stage procedure.

The sodium or the like chloride or free chlorine formed in the present process may be recycled to improve the economy of the procedure. It is, of course, well known that chlorine and sodium chloride, respectively, can be converted to chlorate or perchloric acid.

The inventive process has many advantages which may be summarized as follows:

(1) Free $ClO_2$ is not released;
(2) Recombination of $ClO_2$ with alkali is hence not required;
(3) No critical concentration of $ClO_2$ has to be considered;
(4) No harmful or dangerous degeneration or decomposition products are formed;
(5) The process is easy to carry out and no special safety measures have to be taken, provided a temperature of above 200° C. is avoided;
(6) The purity of the metal chlorite formed is very high and usually exceeds 98.9%;
(7) The process results in essentially quantitative yield;
(8) Reaction may be carried out at any desired concentration level;
(9) Elaborate equipment is not necessary; and
(10) No explosion chamber is required.

It will be appreciated that the metal chloride used in the reaction acts in the nature of an accelerator.

The invention will now be described by several examples, it being understood, however, that these examples are given by way of illustration and not by way of limitation and that many changes may be effected without affecting in any way the scope and spirit of the invention as recited in the appended claims.

EXAMPLE I 176 g. of $NaClO_3$ were placed in a round bottom flask. 125 cc. of perchloric acid of 80% concentration were added to the flask. The solution thus formed was admixed with 110 g. of sodium chloride in the form of a slurry containing 10 cc. of water. The flask was then placed on a water bath for heating purposes and the contents of the flask were constantly stirred. The stirring was continued at a temperature of about 100° C. for about 15 minutes.

The warm solution was then poured into a tray and subjected to air drying. The dry product thus obtained weighed 271 g. and was analyzed by ultraviolet spectrophotometry in a Beckman spectrophotometer as follows: The dry residue was diluted to 1 liter with doubly distilled deionized water. The graph showed a peak at 268 m$\mu$. For control purposes, a reference blank was prepared with pure $NaClO_2$ as supplied by Olin Mathieson. 271 g. of the pure $NaClO_2$ were diluted with the same water to one liter. The control or blank was placed in the path of the emission light while the product from the tray was placed in the reference compartment of the Beckman device. The peaks of both the control and the test sample were the same. The yield was 98.4%.

EXAMPLE II

Lithium chlorite was prepared in the manner described in Example I by reacting 90 g. of lithium chlorate $LiClO_3$ with 125 cc. of $HClO_4$ of 80% concentration and 82 g. of lithium chloride. 219 g. of dry product were obtained and run against a pure lithium chlorite. The test established that the lithium chlorite formed in the process was essentially pure. The yield was 98.7%.

EXAMPLE III

The procedure of Example I was repeated, but the reactants were 123 g. of calcium chlorate, 125 cc. of perchloric acid of 80% concentration, and 150 g. of calcium chloride. The residue on the tray weighed 315 g. and proved to be pure calcium chlorite. The yield was 97.9%.

Further experiments indicated that excess amounts of chlorate or chloride may increase the difficulties of separating the reaction products from each other, although the yield is not affected. An excess of perchloric acid tends to liberate $ClO_2$ gas and decrease the yield of the chlorite.

In respect to the temperature, it was noted that temperature ranges of 80—90° result in a slightly slower reaction than the reaction that takes place at about 100° C. or higher.

While specific embodiments of the invention have been shown and described in detail to illustrate the application of the inventive principles, it will be understood that the invention may be embodied otherwise without departing from such principles.

What is claimed is:
1. A process for producing alkali metal chlorite or alkaline earth metal chlorite, which comprises reacting
    (a) alkali metal chlorate or alkaline earth metal chlorate,
    (b) perchloric acid and
    (c) alkali metal chloride or alkaline earth metal chloride at elevated temperature, said reactants (a), (b) and (c) being reacted in substantially stoichiometric amounts, whereby an alkali metal chlorite or alkaline earth metal chlorite is formed whose metal portion corresponds to the metal portion of the chloride.
2. A process as claimed in claim 1, wherein the reaction is carried out at a temperature of about 100° C.
3. A process as claimed in claim 1, wherein the reaction is carried out at a temperature of about between 70–200° C.
4. A process as claimed in claim 1, wherein the reaction is carried out in the presence of water.
5. A process as claimed in claim 1, wherein the chlorate is an alkali earth metal chlorate while the chloride is sodium chloride.
6. A process as claimed in claim 1, wherein the chlorate is sodium chlorate while the chloride is an alkaline earth metal chloride.
7. A process as claimed in claim 1, wherein both the chlorate and the chloride are the sodium salts.
8. A process as claimed in claim 1, wherein the reaction proceeds according to the equation

$$MClO_3 + HClO_4 + 2MCl + 3MClO_2 + Cl^- + OH^-$$

wherein M is alkali metal or alkaline earth metal.
9. A process as claimed in claim 8, wherein the chlorine formed in the reaction is removed from the reaction mixture and the remaining chlorite is dried.
10. A process as claimed in claim 1, wherein the mole ratio of said chlorate, said perchloric acid and said chloride is substantially 1:1:2.

References Cited

UNITED STATES PATENTS

| | | | |
|---|---|---|---|
| 3,404,952 | 10/1968 | Westerlund | 23—85 |
| 3,056,656 | 10/1962 | Nicolaisen | 23—85 |
| 2,489,571 | 11/1949 | Hampel | 23—85 |

LELAND A. SEBASTIAN, Primary Examiner